US010699274B2

(12) United States Patent
Peng et al.

(10) Patent No.: US 10,699,274 B2
(45) Date of Patent: Jun. 30, 2020

(54) APPARATUS AND METHOD FOR SECURE ELECTRONIC PAYMENT

(71) Applicant: Samsung Electronics Co., Ltd., Suwon-si, Gyeonggi-do (KR)

(72) Inventors: Pai Peng, Mountain View, CA (US); Shyam Prasad, Mountain View, CA (US); Bulent Kasman, Mountain View, CA (US)

(73) Assignee: Samsung Electronics Co., Ltd., Suwon-si (KR)

(*) Notice: Subject to any disclaimer, the term of this patent is extended or adjusted under 35 U.S.C. 154(b) by 740 days.

(21) Appl. No.: 15/221,030

(22) Filed: Jul. 27, 2016

(65) Prior Publication Data
US 2017/0061437 A1 Mar. 2, 2017

Related U.S. Application Data

(60) Provisional application No. 62/209,125, filed on Aug. 24, 2015.

(51) Int. Cl.
G06Q 20/40 (2012.01)
H04W 12/06 (2009.01)
G06Q 20/34 (2012.01)
H04L 29/06 (2006.01)
H04W 4/80 (2018.01)

(52) U.S. Cl.
CPC ......... *G06Q 20/4014* (2013.01); *G06Q 20/34* (2013.01); *H04L 63/0823* (2013.01); *H04L 63/0861* (2013.01); *H04W 12/06* (2013.01); *H04W 4/80* (2018.02)

(58) Field of Classification Search
CPC ...................................................... G06Q 20/40
USPC ...................................................... 705/35–45
See application file for complete search history.

(56) References Cited

U.S. PATENT DOCUMENTS

| 5,784,463 | A | 7/1998 | Chen et al. |
| 6,357,006 | B1 | 3/2002 | Pram et al. |
| 7,767,430 | B2 | 8/2010 | Neeser et al. |
| 8,302,201 | B1 | 10/2012 | Gupta et al. |
| 8,375,220 | B2 | 2/2013 | Prakash et al. |
| 8,489,067 | B2 | 7/2013 | Rackley, III et al. |
| 8,533,803 | B2 | 9/2013 | Cha et al. |

(Continued)

FOREIGN PATENT DOCUMENTS

| EP | 1 176 844 A3 | 5/2002 |
| EP | 2 856 407 A1 | 4/2015 |

(Continued)

OTHER PUBLICATIONS

Reddy et al., A Practical Approach for Implementation of Public Key Infrastructure for Digital Signatures, Journal of Information Engineering and Applications, ISSN 2224-5758 (print) ISSN 2224-896X (online), vol. 1, No. 2, 2011.

(Continued)

*Primary Examiner* — Robert R Niquette

(57) ABSTRACT

An apparatus and method for secure electronic payment are provided. The method includes authenticating a user of an electronic device executing a trusted payment application in a trusted execution environment of the electronic device, receiving credit card data from the user, generating credit card track data based on the received credit card data, and storing the credit card track data.

21 Claims, 5 Drawing Sheets

(56) References Cited

U.S. PATENT DOCUMENTS

| | | | |
|---|---|---|---|
| 8,744,914 B2 | 6/2014 | Mon et al. | |
| 8,966,268 B2 | 2/2015 | Marien | |
| 8,977,567 B2* | 3/2015 | Aabye | G06Q 20/202 |
| | | | 705/39 |
| 9,008,618 B1 | 4/2015 | Fox | |
| 9,022,285 B2 | 5/2015 | Graylin | |
| 9,055,314 B2 | 6/2015 | Yin et al. | |
| 9,070,122 B1 | 6/2015 | Geller et al. | |
| 9,112,703 B2 | 8/2015 | Wood et al. | |
| 9,118,464 B2 | 8/2015 | Nix | |
| 9,123,036 B2 | 9/2015 | Graylin et al. | |
| 9,129,199 B2 | 9/2015 | Spodak et al. | |
| 9,130,910 B1 | 9/2015 | Logue | |
| 9,135,424 B2 | 9/2015 | Taveau et al. | |
| 9,137,025 B2 | 9/2015 | Lambert | |
| 9,161,196 B2 | 10/2015 | Ballantyne et al. | |
| 9,161,225 B2 | 10/2015 | Pecen et al. | |
| 9,166,953 B2 | 10/2015 | Luukkala et al. | |
| 9,167,428 B2 | 10/2015 | Buntinx | |
| 2003/0217165 A1 | 11/2003 | Buch et al. | |
| 2004/0098352 A1 | 5/2004 | Matsuyama | |
| 2007/0204153 A1 | 8/2007 | Tome et al. | |
| 2008/0320566 A1 | 12/2008 | Herzog et al. | |
| 2010/0138912 A1 | 6/2010 | Bauchot et al. | |
| 2011/0022835 A1 | 1/2011 | Schibuk | |
| 2011/0099112 A1* | 4/2011 | Mages | G06Q 20/02 |
| | | | 705/64 |
| 2011/0106674 A1 | 5/2011 | Perlman | |
| 2011/0191244 A1 | 8/2011 | Dai | |
| 2011/0239304 A1 | 9/2011 | Saarisalo | |
| 2011/0246315 A1 | 10/2011 | Spies et al. | |
| 2011/0289006 A1 | 11/2011 | Hutchison et al. | |
| 2011/0314538 A1 | 12/2011 | Huang et al. | |
| 2011/0320314 A1 | 12/2011 | Brown | |
| 2011/0320345 A1 | 12/2011 | Taveau et al. | |
| 2012/0101951 A1 | 4/2012 | Li et al. | |
| 2012/0150742 A1 | 6/2012 | Poon et al. | |
| 2012/0221467 A1 | 8/2012 | Hamzeh et al. | |
| 2012/0330843 A1 | 12/2012 | Von Mueller et al. | |
| 2013/0007114 A1 | 1/2013 | Wee et al. | |
| 2013/0031374 A1 | 1/2013 | Thom et al. | |
| 2013/0124420 A1 | 5/2013 | Duri et al. | |
| 2013/0168450 A1 | 7/2013 | Von Mueller et al. | |
| 2013/0305392 A1 | 11/2013 | Bar-El et al. | |
| 2013/0347064 A1* | 12/2013 | Aissi | G06F 21/30 |
| | | | 726/2 |
| 2014/0013406 A1 | 1/2014 | Tremlet | |
| 2014/0096226 A1 | 4/2014 | Barkan | |
| 2014/0101679 A1 | 4/2014 | Yin et al. | |
| 2014/0122873 A1 | 5/2014 | Deutsch et al. | |
| 2014/0156534 A1 | 6/2014 | Quigley et al. | |
| 2014/0172597 A1 | 6/2014 | Spies et al. | |
| 2014/0180931 A1 | 6/2014 | Lie et al. | |
| 2014/0246490 A1 | 9/2014 | Graylin | |
| 2014/0249948 A1* | 9/2014 | Graylin | G06Q 20/12 |
| | | | 705/21 |
| 2014/0289130 A1 | 9/2014 | Savolainen et al. | |
| 2014/0317686 A1 | 10/2014 | Vetillard | |
| 2014/0344155 A1 | 11/2014 | Liu et al. | |
| 2014/0358794 A1 | 12/2014 | Finley | |
| 2015/0006392 A1 | 1/2015 | Brand et al. | |
| 2015/0006404 A1 | 1/2015 | Beidl et al. | |
| 2015/0072726 A1 | 3/2015 | Stern | |
| 2015/0081554 A1* | 3/2015 | Wong | G06Q 20/401 |
| | | | 705/44 |
| 2015/0082025 A1 | 3/2015 | Deshpande | |
| 2015/0100788 A1 | 4/2015 | Chastain et al. | |
| 2015/0229477 A1 | 8/2015 | Blair et al. | |
| 2015/0235204 A1* | 8/2015 | Wallner | G06Q 20/322 |
| | | | 705/39 |
| 2015/0235290 A1 | 8/2015 | Boemi et al. | |
| 2015/0269582 A1 | 9/2015 | Simmons | |
| 2015/0287029 A1 | 10/2015 | Park et al. | |
| 2015/0302201 A1 | 10/2015 | Ryu | |
| 2015/0348026 A1* | 12/2015 | Roberts | G06Q 20/10 |
| | | | 705/71 |
| 2015/0381369 A1 | 12/2015 | Broumas et al. | |
| 2016/0036892 A1 | 2/2016 | Twitchell, Jr. | |
| 2016/0080468 A1 | 3/2016 | Lambert et al. | |
| 2016/0092876 A1* | 3/2016 | Kamal | G06K 9/00597 |
| | | | 705/44 |
| 2016/0162893 A1* | 6/2016 | Kamal | G06Q 20/405 |
| | | | 705/44 |
| 2016/0253651 A1* | 9/2016 | Park | G07F 9/023 |
| | | | 705/39 |
| 2016/0253652 A1* | 9/2016 | Je | G06Q 20/34 |
| | | | 705/39 |

FOREIGN PATENT DOCUMENTS

| | | |
|---|---|---|
| KR | 10-0646350 B1 | 11/2006 |
| WO | 2006/035421 A2 | 4/2006 |
| WO | 2012/068094 A1 | 5/2012 |
| WO | 2014/081073 A1 | 5/2014 |
| WO | 2014/149498 A2 | 9/2014 |
| WO | 2015/023504 A1 | 2/2015 |
| WO | 2015/126753 A1 | 8/2015 |

OTHER PUBLICATIONS

About Apple Pay in the US, Apple Support, https://support.apple.com/en-us/HT201469.

Wallner, Stronger Security and Mobile Payments—Dramatically Faster and Cheaper to Implement, LoopPay White Paper, 2014 LoopPay, Inc.

Ibrahim, Receiver-deniable Public-Key Encryption, International Journal of Network Security, vol. 8, No. 2, pp. 159-165, Mar. 2009.

Storage Security and Mobile Payments—Dramatically Faster and Cheaper to Implement, LoopPay White Papers by George Wallner, 2014.

About Apple Pay in Us—Apple Support, Oct. 22, 2015.

Asokan et al., Mobile Trusted Computing, Proceedings of the IEEE, vol. 102, No. 8, pp. 1189-1206, Aug. 2014.

Feng et al., Secure Session on Mobile: An Exploration on Combining Biometric, TrustZone, and User Behavior, 2014 6th International Conference on Mobile Computing, Applications and Services (MobiCASE), Proceedings: 249. IEEE. (conference Nov. 2014).

Lohr et al., Patterns for Secure Boot and Secure Storage in Computer Systems, 2010 International Conference on Availability, Reliability and Security, Krakow, 2010, pp. 569-573. doi: 10.1109/ARES.2010.110.

U.S. Non-Final Office Action dated Oct. 19, 2018, issued in the U.S. Appl. No. 15/156,871.

U.S. Final Office Action dated Apr. 9, 2019, issued in U.S. Appl. No. 15/156,871.

European Office Action dated Mar. 27, 2019, issued in European Application No. 16755954.1.

European Patent Office, "Communication pursuant to Article 94(3) EPC," Application No. EP 16839570.5, dated Oct. 9, 2019, 6 pages.

European Patent Office, "Communication pursuant to Article 94(3) EPC," Application No. EP 16839601.8, dated Oct. 9, 2019, 8 pages.

* cited by examiner

APPARATUS AND METHOD FOR SECURE ELECTRONIC PAYMENT

CROSS-REFERENCE TO RELATED APPLICATION(S)

This application claims the benefit under 35 U.S.C. § 119(e) of a U.S. Provisional application filed on Aug. 24, 2015 in the U.S. Patent and Trademark Office and assigned Ser. No. 62/209,125, the entire disclosure of which is hereby incorporated by reference.

TECHNICAL FIELD

The present disclosure relates to an apparatus and method for secure electronic payment. More particularly, the present disclosure relates to an apparatus and method for secure electronic payment using magnetic stripe transmission.

BACKGROUND

Mobile terminals were developed to provide wireless communication between users. As technology has advanced, mobile terminals now provide many additional features beyond simple telephone conversation. For example, mobile terminals are now able to provide additional functions such as an alarm, a Short Messaging Service (SMS), a Multimedia Message Service (MMS), E-mail, games, remote control of short range communication, an image capturing function using a mounted digital camera, a multimedia function for providing audio and video content, a scheduling function, and many more. With the plurality of features now provided, a mobile terminal has effectively become a necessity of daily life.

One such feature recently being offered via mobile terminals is an electronic payment application, such as Apple Pay™ and Samsung Pay™. These applications allow a user to enter credit card or other payment information, either by taking a picture of the front and back of the card or by entering the information manually, and then subsequently use their mobile phone to pay by credit card at various retailers. Once the user has entered the credit card information, the user may pay by credit card by placing the mobile terminal in close proximity to the point of sale (POS) machine or credit card reader. Typically, the mobile terminal uses a short-range communication technology such as near field communication (NFC) to communicate with the reader and transmit the credit card details.

However, credit card fraud is an increasing problem. A criminal could steal a user's credit information and enter that information in the criminal's own mobile terminal, thereby allowing the criminal free access to the user's credit card. Indeed, as data for millions of stolen credit cards is readily available on the black market, the potential for fraud and abuse of electronic payment applications is not insignificant.

Accordingly, there is a need for an apparatus and method for providing an improved user interface while reducing power consumption in a mobile terminal.

SUMMARY

Aspects of the present disclosure are to address at least the above-mentioned problems and/or disadvantages and to provide at least the advantages described below. Accordingly, an aspect of the present disclosure is to provide an apparatus and method for secure electronic payment In accordance with an aspect of the present disclosure, a method for secure electronic payment is provided. The method includes authenticating a user of an electronic device executing a trusted payment application in a trusted execution environment of the electronic device; receiving credit card data from the user; generating credit card track data based on the received credit card data; and storing the credit card track data.

In accordance with another aspect of the present disclosure, an apparatus for secure electronic payment is provided. The apparatus includes a memory, a magnetic stripe swipe simulator configured to generate a magnetic field capable of being read by a magnetic card reader, and a processor configured to execute a trusted execution environment including a trusted payment application. The trusted payment application includes instructions to authenticate a user, receive credit card data from the user, generate credit card track data based on the received credit card data, and store the credit card track data in the memory.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of various embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
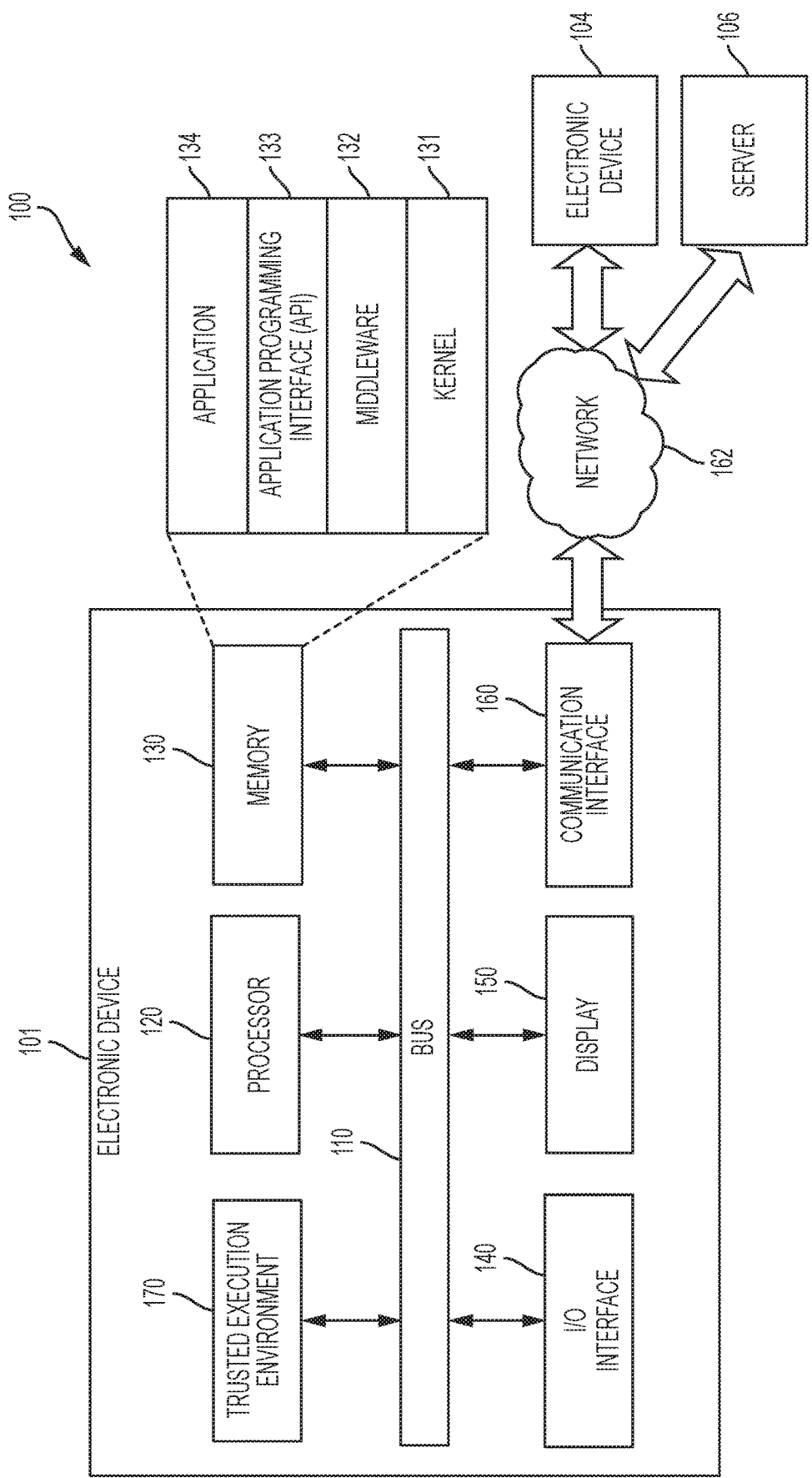
FIG. 1 illustrates a network environment including an electronic device according to an embodiment of the present disclosure.

Detailed descriptions of various aspects of the present disclosure will be discussed below with reference to the attached drawings. The descriptions are set forth as examples only, and shall not limit the scope of the present disclosure.

The detailed description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the disclosure. In addition, descriptions of well-known functions and constructions are omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the present disclosure are provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Unless defined differently, all terms used in the present disclosure, including technical or scientific terms, have meanings that are understood generally by a person having ordinary skill in the art. Ordinary terms that may be defined in a dictionary should be understood to have the meaning consistent with their context, and unless clearly defined in the present disclosure, should not be interpreted to be excessively idealistic or formalistic.

According to various embodiments of the present disclosure, an electronic device may include communication functionality. For example, an electronic device may be a smart phone, a tablet Personal Computer (PC), a mobile phone, a video phone, an e-book reader, a desktop PC, a laptop PC, a netbook PC, a Personal Digital Assistant (PDA), a Portable Multimedia Player (PMP), an MP3 player, a mobile medical device, a camera, a wearable device (e.g., a Head-Mounted Device (HMD), electronic clothes, electronic braces, an electronic necklace, an electronic appcessory, an electronic tattoo, or a smart watch), and/or the like.

According to various embodiments of the present disclosure, an electronic device may be a smart home appliance with communication functionality. A smart home appliance may be, for example, a television, a Digital Video Disk (DVD) player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be a medical device (e.g., Magnetic Resonance Angiography (MRA) device, a Magnetic Resonance Imaging (MRI) device, Computed Tomography (CT) device, an imaging device, or an ultrasonic device), a navigation device, a Global Positioning System (GPS) receiver, an Event Data Recorder (EDR), a Flight Data Recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

FIG. 1 illustrates a network environment according to an embodiment of the present disclosure.

Referring to FIG. 1, a network environment 100 includes an electronic device 101. The electronic device 101 may include a bus 110, a processor 120, a memory 130, an Input/Output (I/O) interface 140, a display 150, a communication interface 160, a trusted execution environment 170, and/or the like.

The bus 110 may be circuitry that connect the foregoing components and allow communication between the foregoing components. For example, the bus 110 may connect components of the electronic device 101 so as to allow control messages and/or other information to be communicated between the connected components.

The processor 120 may, for example, receive instructions from other components (e.g., the memory 130, the I/O interface 140, the display 150, the communication interface 160, the trusted execution environment 170, and/or the like), interpret the received instructions, and execute computation or data processing according to the interpreted instructions.

The memory 130 may, for example, store instructions and/or data that are received from, and/or generated by, other components (e.g., the memory 130, the I/O interface 140, the display 150, the communication interface 160, the trusted execution environment 170, and/or the like). For example, the memory 130 may include programming modules such as a kernel 131, a middleware 132, an Application Programming Interface (API) 133, an application 134, and/or the like. Each of the foregoing programming modules may include a combination of at least two of software, firmware, or hardware.

The kernel 131 may control or manage system resources (e.g., the bus 110, the processor 120, the memory 130, and/or the like) that may be used in executing operations or functions implemented in other programming modules such as, for example, the middleware 132, the API 133, the application 134, and/or the like. The kernel 131 may provide an interface for allowing or otherwise facilitating the middleware 132, the API 133, the application 134, and/or the like, to access individual components of electronic device 101.

The middleware 132 may be a medium through which the kernel 131 may communicate with the API 133, the application 134, and/or the like to send and receive data. The middleware 132 may control (e.g., scheduling, load balancing, and/or the like) work requests by one or more applications 134. For example, the middleware 132 may control work requests by one or more applications 134 by assigning priorities for using system resources (e.g., the bus 110, the processor 120, the memory 130, and/or the like) of electronic device 101 to the one or more applications 134.

The API 133 may be an interface that may control functions that the application 134 may provide at the kernel 131, the middleware 132, and/or the like. For example, the API 133 may include at least an interface or a function (e.g., command) for file control, window control, video processing, character control, and/or the like.

According to various embodiments of the present disclosure, the application 134 may include a Short Message Service (SMS) application, a Multimedia Messaging Service (MMS) application, an email application, a calendar application, an alarm application, a health care application (e.g., an exercise amount application, a blood sugar level measuring application, and/or the like), an environmental information application (e.g., an application that may provide atmospheric pressure, humidity, temperature information, and/or the like), an instant messaging application, a call application, an internet browsing application, a gaming application, a media playback application, an image/video capture application, a file management application, and/or the like. In addition to or as an alternative to, the application 134 may be an application that is associated with information exchange between the electronic device 101 and an external electronic device (e.g., electronic device 104). As an example, the application 134 that is associated with the information exchange may include a notification relay application that may provide the external electronic device with a certain type of information, a device management application that may manage the external electronic device, and/or the like.

As an example, the notification relay application may include a functionality that provides notification generated by other applications at electronic device 101 (e.g., the SMS/MMS application, the email application, the health care application, the environmental information application, the instant messaging application, the call application, the internet browsing application, the gaming application, the media playback application, the image/video capture application, the file management application, and/or the like) to an external electronic device (e.g., the electronic device 104). In addition to or as an alternative to, the notification relay application may provide, for example, receive notification from an external electronic device (e.g., the electronic device 104), and may provide the notification to a user.

As an example, the device management application may manage enabling or disabling of functions associated with least a portion of an external electronic device (e.g., the external electronic device itself, or one or more components of the external electronic device) in communication with electronic device 101, controlling of brightness (or resolution) of a display of the external electronic device, an application operated at, or a service (e.g., a voice call service, a messaging service, and/or the like) provided by, the external electronic device, and/or the like.

According to various embodiments of the present disclosure, the application 134 may include one or more applications that are determined according to a property (e.g., type of electronic device, and/or the like) of the external electronic device (e.g., the electronic device 104). For example, if the external electronic device is an mp3 player, the application 134 may include one or more applications related to music playback. As another example, if the external electronic device is a mobile medical device, the application 134 may be a health care-related application. According to various embodiments of the present disclosure, the application 134 may include at least one of an application that is preloaded at the electronic device 101, an application that is received from an external electronic device (e.g., the electronic device 104, a server 106, and/or the like), and/or the like.

The I/O interface 140 may, for example, receive instruction and/or data from a user. The I/O interface 140 may send the instruction and/or the data, via the bus 110, to the processor 120, the memory 130, the communication interface 160, the trusted execution environment 170, and/or the like. For example, the I/O interface 140 may provide data associated with user input received via a touch screen to the processor 120. The I/O interface 140 may, for example, output instructions and/or data received via the bus 110 from the processor 120, the memory 130, the communication interface 160, the trusted execution environment 170, and/or the like, via an I/O device (e.g., a speaker, a display, and/or the like). For example, the I/O interface 140 may output voice data (e.g., processed using the processor 120) via a speaker.

The display 150 may display various types of information (e.g., multimedia, text data, and/or the like) to the user. As an example, the display 150 may display a Graphical User Interface (GUI) with which a user may interact with the electronic device 101.

The communication interface 160 may provide communication between electronic device 101 and one or more external electronic devices (e.g., the electronic device 104, the server 106, and/or the like). For example, the communication interface 160 may communicate with the external electronic device by establishing a connection with a network 162 using wireless or wired communication. As an example, wireless communication with which the communication interface 160 may communicate may be at least one of, Wi-Fi, Bluetooth, Near Field Communication (NFC), Global Positioning System (GPS), cellular communication (e.g., Long Term Evolution (LTE), LTE Advanced (LTE-A), Code Division Multiple Access (CDMA), Wideband-CDMA (WDCMA), Universal Mobile Telecommunications System (UMTS), Wireless Broadband (WiBro), Global System for Mobile Communications (GSM), and/or the like), Infrared Data Association (IrDA) technology, and/or the like. As an example, wired communication with which the communication interface 160 may communicate may be at least one of, for example, Universal Serial Bus (USB), High Definition Multimedia Interface (HDMI), Recommended Standard 232 (RS-232), Plain Old Telephone Service (POTS), Ethernet, and/or the like.

According to various embodiments of the present disclosure, the network 162 may be a telecommunications network. As an example, the telecommunications network may include at least one of a computer network, the Internet, the Internet of Things, a telephone network, and/or the like. According to various embodiments of the present disclosure, a protocol (e.g., a transport layer protocol, a data link layer protocol, a physical layer protocol, and/or the like) for communicating between electronic device 101 and an external electronic device may be supported by at least one of the application 134, the API 133, the middleware 132, the kernel 131, the communication interface 160, and/or the like.

The trusted execution environment 170 is a secure operating environment, and may include a hardware component and a software component. In general, the trusted execution environment 170 executes secure applications, with limited access to other elements and components of the electronic device 101. Similarly, applications 134 executing outside the trusted execution environment 170 have limited or no access to applications executing inside the trusted execution environment 170.

The hardware component may include a secure system on chip (SoC) dedicated to executing applications and other software in the trusted execution environment. This hardware component may be isolated from other hardware components of the electronic device 101, in order to achieve greater security. Through the hardware component, the trusted execution environment 170 may offer a secure boot option, in which the electronic device 101 boots directly into the trusted execution environment.

Figure 2:
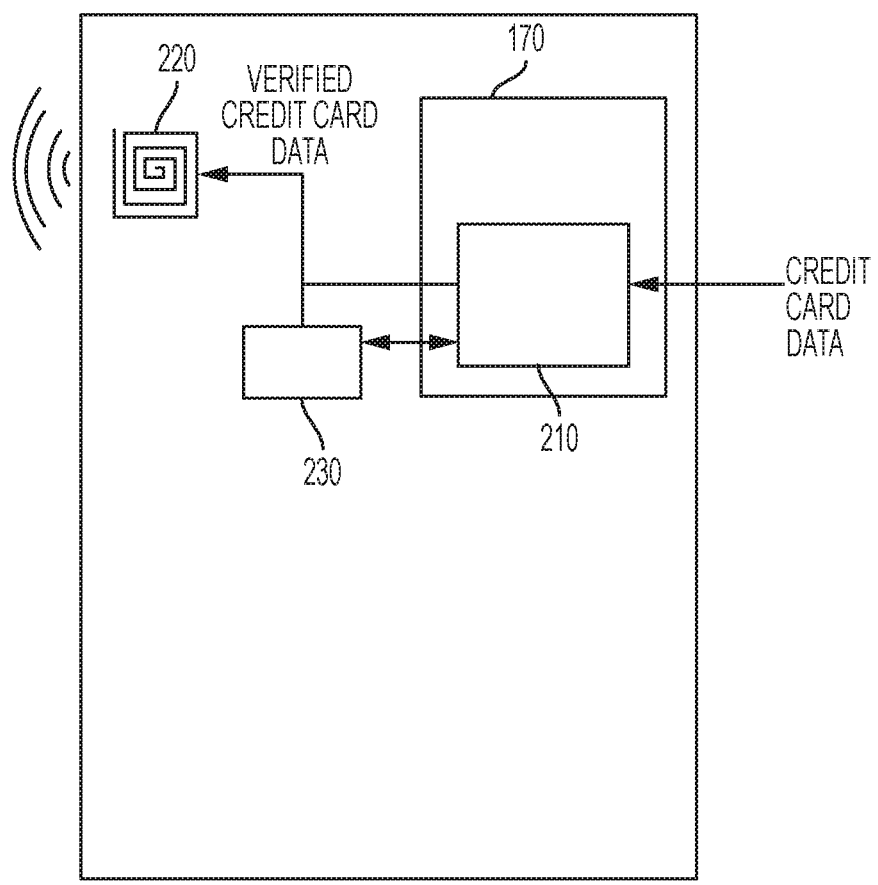
FIG. 2 illustrates an electronic device having a trusted execution environment according to various embodiments of the present disclosure.

FIG. 2 illustrates an electronic device having a trusted execution environment according to various embodiments of the present disclosure.

Referring to FIG. 2, the electronic device 101 may, in addition to the trusted execution environment 170 and the other components shown in FIG. 1, also include a trusted payment application 210, a magnetic stripe swipe simulator 220, and an electronic payment application 230.

The trusted payment application 210 is a secure application that executes within the trusted execution environment 170. The trusted payment application 210 may interact with other components or peripheral devices (such as a touch-screen or display) via an isolated peripheral connection between the trusted execution environment 170 and the components or peripheral devices. The isolated peripheral connection may, for example, be implemented at least in part by a secure application program interface (API). In particular, the trusted payment application 210 may communicate with the electronic payment application 230 via a secure channel or API.

By executing within the trusted execution environment 170, the trusted payment application 210 may ensure that the user's sensitive financial credentials and personal information cannot be accessed by a malicious entity, or by other applications running in the trusted execution environment 170 or the general operating system of the electronic device (or runtime execution environment). The electronic payment application 230 handles other, non-secure aspects of electronic payment.

The magnetic stripe swipe simulator 220 is another example of a peripheral device with which the trusted payment application 210 may communicate with via the isolated peripheral connection. The magnetic stripe swipe simulator 220 simulates the swiping of a magnetic card stripe on a credit card when the electronic device 101 is brought near the magnetic read heads of the magnetic card reader. The magnetic card reader reads the information encoded on the magnetic stripe of a credit card by detecting the magnetic flux generated when the user swipes the magnetic stripe near the magnetic read heads. The magnetic stripe swipe simulator 220 is constructed to generate a comparable magnetic flux that the magnetic card reader can read.

The magnetic stripe swipe simulator 220 may be, for example, a copper coil to which an electric signal is applied. When a modulated electric signal is applied to the copper coil, a magnetic field having a flux based on the modulated electric signal is generated. The magnetic card reader is able to read this magnetic field in the same way as swiping a credit card through the magnetic card reader.

The trusted payment application 210 or the electronic payment application 230 may control the magnetic stripe swipe simulator 220 to generate the modulated electric signal based on stored credit card track data (or track data constructed by the trusted payment application 210). For example, the trusted payment application 210 may provide the stored credit card track data to the magnetic stripe simulator 220 directly, or the trusted payment application 210 may provide the stored credit card track data to the electronic payment application 230. Various aspects of the present disclosure provide a mechanism for the trusted payment application 210 to generate the necessary credit card track data in a secure and trusted fashion. Exemplary methods are described below with respect to FIGS. 3 and 4.

Figure 3:
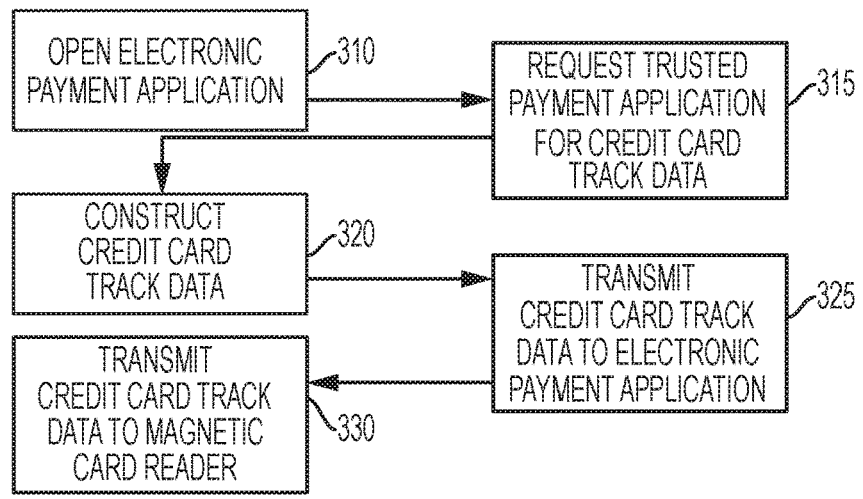
FIG. 3 illustrates an overview of a method of secure electronic payment according to an exemplary embodiment of the present disclosure.

FIG. 3 illustrates an overview of a method of secure electronic payment according to an exemplary embodiment of the present disclosure.

Referring to FIG. 3, the user opens the electronic payment application 230 in operation 310. If this is the first time using the electronic payment application 230, the user may be prompted to enter authentication information. The authentication information may be secret information about the user, a password, or the like. If the electronic device 101 includes a biometric reader (such as a fingerprint reader), the authentication information may include fingerprint information. As part of the authentication process, the electronic payment application 230 may communicate with an authentication server to authenticate the user.

Once the user is authenticated, the electronic payment application 230 may perform an enrollment process. The enrollment process may include requesting certain information from the user. The information may include a full name, billing address, contact information (such as E-mail address or telephone number), and other information that may be useful in authenticating the user, generating credit card track data, or engaging in electronic payment. In addition, the user may be requested to provide a user name and password (or Personal Identification Number (PIN)) to enter when the user accesses the electronic payment application 230 in the future. According to another embodiment of the present disclosure, the user may be requested to provide biometric information, such as a fingerprint, which may be used for subsequent access.

If this is not the first time using the electronic payment application 230, the user may undergo a shortened authentication process. The shortened process may include entering a previously provided user name and password. Alternatively, the electronic payment application 230 may request enrollment information each time the user executes the electronic payment application 230.

At operation 315, the electronic payment application requests the credit card track data from the trusted payment application 210. The electronic payment application 230 may make the request through a secure channel or API function call. Operation 315 may be performed in response to user input, such as by selecting an icon or menu item corresponding to creation of credit card track data within the electronic payment application 230.

At operation 320, the electronic payment application 230 constructs the credit card track data. The credit card track data corresponds to the data present on the credit card's magnetic stripe, and is generated in the same format as the data on the magnetic stripe. For example, the magnetic tracks may be formatted according to the International Organization for Standardization (ISO)/International Electrotechnical Commission (IEC) 7813 standard, which defines the data structure and content of the magnetic tracks present on the magnetic stripe. Accordingly, the trusted payment application 210 may generate the credit card track data in conformity with the ISO/IEC 7813 standard. However, this standard is merely exemplary, and the credit card track data may be generated in any appropriate format capable of being read by a magnetic card reader. The generation of the credit card track data is described in more detail below with respect to FIGS. 4 and 5.

Once the trusted payment application 210 generates the credit card track data, the trusted payment application 210 transmits the credit card data to the electronic payment application 230 in operation 325. The electronic payment application 230 stores the credit card track data in a memory of the electronic device 101, such as the memory 130. Alternatively, the electronic payment application 230 may store the credit card data in a secure memory, which may be physically or logically associated with the trusted execution environment 170. According to another exemplary embodiment of the present invention, the secure memory may be a part of the memory 130 or a separate memory. In either case, the secure memory may be separated logically or physically from non-secure memory.

In operation 330, when the user inputs a request to transmit the credit card track data to a magnetic card reader, the electronic payment application 230 generates a signal to apply to the magnetic stripe swipe simulator 220, which in turn generates the magnetic field that can be read by the magnetic card reader. In some implementations, the electronic payment application 230 may display a guide message or interface instructing the user to bring the electronic device 101 in proximity to the magnetic card reader. The electronic payment application 230 may control the magnetic stripe swipe simulator 220 to broadcast the credit card track data for a predetermined time or predetermined number of times; this predetermined time (or number of times) may approximately correspond to the typical amount of time taken for a user to swipe a traditional credit card, or may be a longer period of time to provide time for the user to bring the electronic device 101 into sufficient proximity to the magnetic card reader.

According to another embodiment of the present disclosure, the electronic payment application 230 may request the trusted payment application 210 to control the magnetic stripe swipe simulator 220 to broadcast the credit card track data.

According to another embodiment of the present disclosure, the electronic payment application 230 may control the magnetic stripe swipe simulator 220 to broadcast the credit card track data a predetermined number of times in varying formats. The formats may vary according to baud rate, track encoding (e.g., track 1 or track 2 encoding), or forward/reverse swipe simulation. In this fashion, the electronic payment application 230 may increase the probability that the magnetic card reader will successfully "read" the broadcast (or transmitted) credit card track data.

After the broadcast (or transmission) is complete, the electronic payment application may display a message indicating that the broadcast (or transmission) is complete. In some implementations, the electronic payment application 230 may provide the user with an opportunity to retransmit the credit card track data, in the event that the first attempt was unsuccessful. To improve security, this retransmission option may be limited to a certain number of times (such as three). With this method, the user is able to use the electronic device 101 in place of a traditional credit card in a secure and trusted manner.

Figure 4:
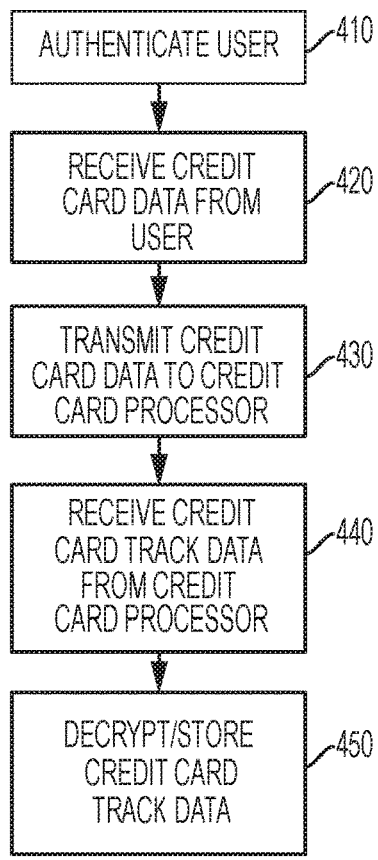
FIG. 4 illustrates a detailed method of secure electronic payment according to an embodiment of the present disclosure.

FIG. 4 illustrates a detailed method of secure electronic payment according to an embodiment of the present disclosure. The operations described with respect to FIG. 4 may be considered a part of operation 320 described above with respect to FIG. 3.

Referring to FIG. 4, after the user opens (or executes) the trusted payment application 210, the user is authenticated in operation 410. The authentication operation may include requesting a password (or PIN), as well as a user ID. In some implementations, biometric authentication may be used instead of the password (or PIN), or the user may be requested to input a corresponding user ID in addition to the PIN.

In operation 420, the user inputs credit card data to the trusted payment application 210. Operation 420 may be performed in response to a user input, such as by selecting an icon (or widget) displayed on the screen, or by selecting a corresponding menu item in a menu (such as a drop-down or pop-up menu).

The credit card information that the user inputs in operation 420 may include the credit card issuing bank, the credit card association (such as Visa, Discover, MasterCard, or American Express), the credit card number, the expiration date, the Card Verification Value (CVV), billing zip code, and the like. The trusted payment application 210 may request a subset of this information, or may request other information relevant to generating the credit card track data.

In operation 430, the trusted payment application 210 packages the credit card data and transmits the package to a corresponding credit card processor. The credit card processor may be determined based on the credit card data input in operation 420. For example, the credit card processor may be determined based on the issuing back or credit card association. The credit card processor may be determined based on the credit card number alone, based on the provider information included as part of the credit card number format.

Although FIG. 4 illustrates one embodiment of generating the credit card track data, it is to be understood that embodiments of the present disclosure are not limited to this. According to another embodiment of the present disclosure, the trusted payment application 210 may generate the credit card track data without requesting the credit card track data from an external server.

Figure 5:
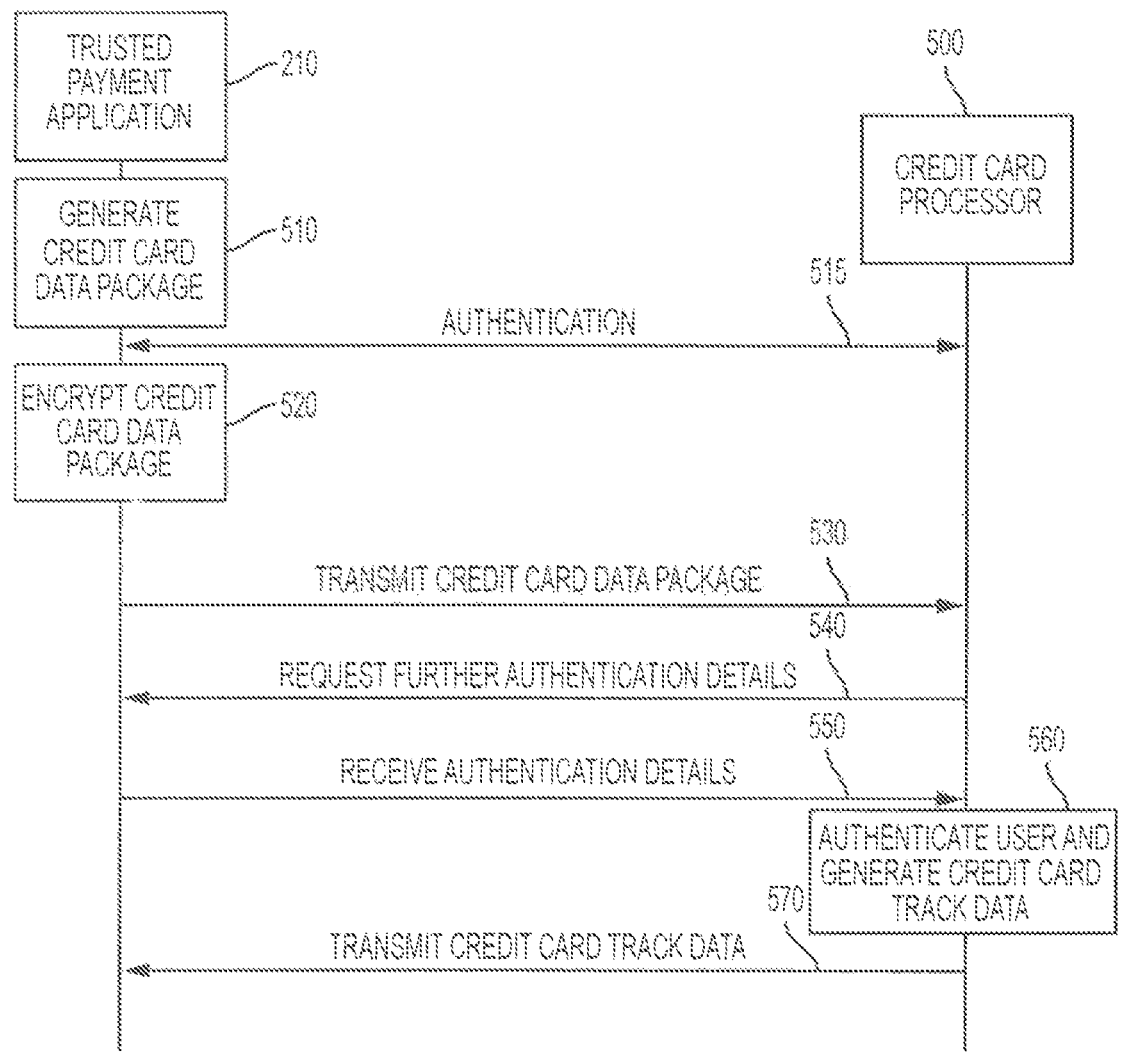
FIG. 5 illustrates an method of generating credit card track data according to an exemplary embodiment of the present disclosure.

FIG. 5 illustrates a method of generating credit card track data according to an exemplary embodiment of the present disclosure. The operations shown in FIG. 5 may be part of operation 430 of FIG. 4.

Referring to FIG. 5, the trusted payment application 210 generates the credit card package in operation 510. The package may also include authentication information of the user and a signed certificate. This authentication information may be derived from the information input during the enrollment process described above with respect to operation 310 of FIG. 3.

The signed certificate may be signed with a public key generated and stored in device during the device manufacturing process. As such, this public key (and the corresponding private key), is uniquely assigned to the particular electronic device, and therefore serves to identify and authenticate the electronic device with the credit card processor. Similarly, the certificate itself may be generated by a trusted certificate authority and stored in the electronic device 101 during the manufacturing process.

In operation 515, the trusted payment application 210 and the credit card processor 500 authenticate each other. The trusted payment application 210 transmits the digital certificate that has been signed with the electronic device 101's private key. The credit card processor 500, in turn, transmits another digital certificate that has been signed with a private key of the credit card processor 500. The trusted payment application 210 may verify the certificate received from the credit card processor 500 using a public key that was given to the device manufacturer during a key exchange ceremony and subsequently stored with electronic device 101 (e.g., during the manufacturing process). Similarly, the credit card processor 500 verifies the electronic device 101's certificate using the electronic device 101's public key that was exchanged with the credit card processor 500 in a similar fashion. According to another embodiment of the present disclosure, the trusted payment application 210 and the credit card processor 500 may exchange more than one signed certificate during the mutual authentication process. In operation 520, the credit card package may be encrypted.

The trusted payment application 210 transmits the package to a credit card processor 500 in operation 530. When the credit card processor 500 receives the package, the credit card processor 500 may request additional information from the user to authenticate the user in operation 540. This additional authentication operation may be performed to ensure that the user of the electronic device 101 is the user associated with the credit card.

The user authentication information may include a password (or PIN) associated with the credit card processor 500. For example, if the credit card is a debit card, the debit card may have an associated PIN, which the credit card processor may use to authenticate the user. The credit card processor 500 may also have an associated online account for the user with a corresponding user name and password. Credit card processors generally use these online accounts to allow the user to view his or her balance, pay bills, and perform other card-related services. The credit card processor 500 may also require that the user utilize such an online account in order to generate the credit card track data, and request the authentication details for the user's online account upon receiving the package from the trusted payment application 210.

In operation 550, the trusted payment application 210 obtains the requested authentication information from the user and transmits the authentication information to the credit card processor 500.

Once the user is authenticated, the credit card processor 500 generates the credit card track data in operation 560 and transmits the credit card track data back to the trusted payment application 210 in operation 570. The credit card track data may be transmitted using a secure connection (e.g., SSL), and may be further encrypted for transmission. The credit card data may be generated statically or dynamically. Static data remains the same across multiple transactions, while dynamic data is generated once per transaction and used only for that transaction.

Referring back to FIG. 4, the trusted payment application 210 receives (and, if necessary, decrypts) the generated track data in operation 440, and stores the track data in a memory (e.g., a secure memory) for future use in operation 450.

In the embodiments described above with respect to FIGS. 4 and 5, the credit card processor 500 generates the credit card track data and transmits the credit card track data to the trusted payment application 210. However, according to another embodiment of the present disclosure, the trusted payment application 210 may generate the credit card track data without communicating with the credit card processor 500. In this case, the trusted payment application 210 generates the credit card track data entirely within the trusted execution environment 170, and does not accept outside input from non-trusted sources. In particular, the trusted payment application 210 will not accept raw track data received from a source other than a verified credit card processor.

It is important to note that the trusted payment application 210 will reject any credit card track data that is obtained in any other way. For example, if the user attempts to input credit card track data to the trusted payment application 210 directly, while bypassing the communication and authentication with the credit card processor 500, the trusted payment application 210 will reject the attempt and will not store the improperly obtained credit card track data. The trusted payment application 210 will only accept signed (or otherwise authenticated) track data received from the credit card processor 500 or generated by the trusted payment application 210 in a method such as the methods described above with respect to FIGS. 4 and 5. Credit card track data that has not been authenticated could be fraudulent. To prevent fraud, the trusted payment application 210 communicates with the credit card processor 500 to generate the credit card track data, or generates the credit card track data entirely within the trusted execution environment 170. This in turn reduces the potential for fraudulent use of the electronic payment application 230.

Figure 6:
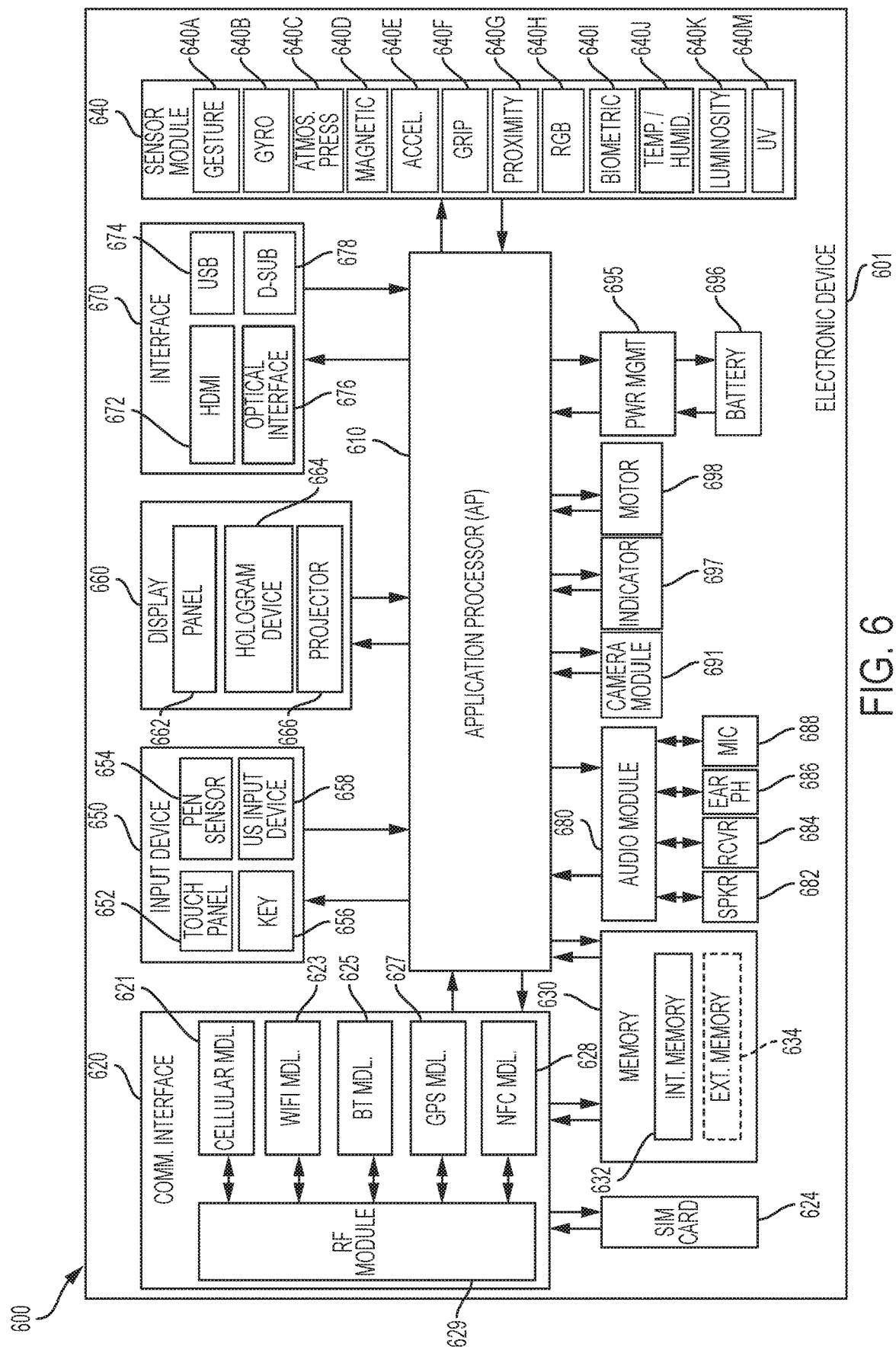
FIG. 6 illustrates a block diagram of hardware according to various embodiments of the present disclosure.

FIG. 6 illustrates a block diagram of hardware according to various embodiments of the present disclosure.

Referring to FIG. 6, the hardware 601 may be, for example, a part or all of the electronic device 101. The hardware 601 may include one or more Application Processors (AP) 610, a communication module 620, a Subscriber Identification Module (SIM) card 624, a memory 630, a sensor module 640, an input module 650, a display module 660, an interface 670, an audio module 680, a camera module 691, a power management module 695, a battery 696, an indicator 697, a motor 698, and/or the like.

The AP 610 may control one or more hardware or software components that are connected to AP 610, perform processing or computation of data (including multimedia data), and/or the like. As an example, the AP 610 may be implemented as a System-on-Chip (SoC). The AP 610 may include a Graphics Processing Unit (GPU) (not shown).

The communication module 620 (e.g., the communication interface 160) may transmit and receive data in communications between the electronic device 101 and other electronic devices (e.g., the electronic device 104, the server 106, and/or the like). The communication module 620 may include one or more of a cellular module 621, a Wi-Fi module 623, a Bluetooth module 625, a GPS module 627, a NFC module 628, a Radio Frequency (RF) module 629, and/or the like.

The cellular module 621 may provide services such as, for example, a voice call, a video call, a Short Messaging Service (SMS), internet service, and/or the like, via a communication network (e.g., LTE, LTE-A, CDMA, WCDMA, UMTS, WiBro, GSM, and/or the like). The cellular module 621 may differentiate and authorize electronic devices within a communication network using a Subscriber Identification Module (SIM) card (e.g., the SIM card 624). According to various embodiments of the present disclosure, the cellular module 621 may perform at least a part of the functionalities of the AP 610. For example, the cellular module 621 may perform at least a part of multimedia control functionality.

According to various embodiments of the present disclosure, the communication interface 620 and/or the cellular module 621 may include a Communication Processor (CP). As an example, the cellular module 621 may be implemented as SoC.

Although FIG. 6 illustrates components such as the cellular module 621 (e.g., CP), the memory 630, the power management module 695 as components that are separate from the AP 610, according to various embodiments of the present disclosure, the AP 610 may include, or be integrated with, one or more of the foregoing components (e.g., the cellular module 621).

According to various embodiments of the present disclosure, the AP 610, the cellular module 621 (e.g., CP), and/or the like, may process instructions or data received from at least one of non-volatile memory or other components by loading in volatile memory. The AP 610, the cellular module 621, the communication interface 620, and/or the like, may store at non-volatile memory at least one of data that is received from at least one of the other components or data that is generated by at least one of the other components.

The Wi-Fi module 623, the Bluetooth module 625, the GPS module 627, the NFC module 628, and/or the like may each include one or more processors that may process data received or transmitted by the respective modules. Although FIG. 6 illustrates the cellular module 621, the Wi-Fi module 623, the Bluetooth module 625, the GPS module 627, and the NFC module 628 as separate blocks, according to various embodiments of the present disclosure, any combination (e.g., two or more) of the cellular module 621, the Wi-Fi module 623, the Bluetooth module 625, the GPS module 627, the NFC module 628, and/or the like may be included in an Integrated Chip (IC) or an IC package. For example, at least some of the processors corresponding to the respective the cellular module 621, the Wi-Fi module 623, the Bluetooth module 625, the GPS module 627, the NFC module 628, and/or the like, may be implemented as a single SoC. For example, a CP corresponding to the cellular module 621 and a Wi-Fi processor corresponding to Wi-Fi module 623 may be implemented as a single SoC.

The RF module 629 may, for example, transmit and receive RF signals. Although not shown, the RF module 629 may include a transceiver, a Power Amp Module (PAM), a frequency filter, a Low Noise Amplifier (LNA), and/or the like. The RF module 634 may include one or more components for transmitting and receiving Electro-Magnetic (EM) waves (e.g., in free space or the like) such as, for example, conductors or conductive wires. Although FIG. 6 illustrates that the cellular module 621, the Wi-Fi module 623, the Bluetooth module 625, the GPS module 627, and the NFC module 628 are sharing one RF module 629, according to various embodiments of the present disclosure, at least one of the cellular module 621, the Wi-Fi module 623, the Bluetooth module 625, the GPS module 627, the NFC module 628, and/or the like may transmit and receive RF signals via a separate RF module.

The SIM card 624 may be a card implementing a SIM, and may be configured to be inserted into a slot disposed at a specified location of the electronic device. The SIM card 624 may include a unique identifier (e.g., Integrated Circuit Card IDentifier (ICCID)) subscriber information (e.g., International Mobile Subscriber Identity (IMSI)), and/or the like.

The memory 630 (e.g., memory 130) may include an internal memory 632, an external memory 634, or a combination thereof.

According to various embodiments of the present disclosure, the internal memory 632 may be, for example, at least one of volatile memory (e.g., Dynamic Random Access Memory (DRAM), Static Random Access Memory (SRAM) or Synchronous Dynamic Random Access Memory (SDRAM)), non-volatile memory (e.g., One Time Programmable Read Only Memory (OTPROM), Programmable Read Only Memory (PROM), Erasable and Programmable Read Only Memory (EPROM), Electrically Erasable and Programmable Read Only Memory (EEPROM), mask Read Only Memory (ROM), flash ROM, NAND flash memory, NOR flash memory), and/or the like.

According to various embodiments of the present disclosure, the internal memory 632 may be a Solid State Drive (SSD). As an example, the external memory 634 may be a flash drive (e.g., Compact Flash (CF drive), Secure Digital (SD), micro Secure Digital (micro-SD), mini Secure Digital (mini-SD), extreme Digital (xD), Memory Stick, and/or the like). The external memory 634 may be operatively coupled to electronic device 601 via various interfaces. According to various embodiments of the present disclosure, the electronic device 601 may include recording devices (or recording media) such as, for example, Hard Disk Drives (HDD), and/or the like.

The sensor module 640 may measure physical/environmental properties detect operational states associated with electronic device 601, and/or the like, and convert the measured and/or detected information into signals such as, for example, electric signals or electromagnetic signals. As an example, the sensor module 640 may include at least one of a gesture sensor 640A, a gyro sensor 640B, an atmospheric pressure sensor 640C, a magnetic sensor 640D, an accelerometer 640E, a grip sensor 640F, a proximity sensor 640G, an RGB sensor 640H, a biometric sensor 640I, a temperature/humidity sensor 640J, a luminosity sensor 640K, a Ultra Violet (UV) sensor 640M, and/or the like. The sensor module 640 may detect the operation state of the electronic device and/or measure physical properties, and convert the detected or measured information into electrical signals. Additionally or alternatively, the sensor module 640 may also include, for example, an electrical-nose sensor (not shown), an electromyography (EMG) sensor (not shown), an electroencephalogram (EEG) sensor (not shown), an infrared (IR) sensor (not shown), an eye-scanning sensor (e.g., iris sensor) (not shown), a fingerprint sensor, and/or the like. The sensor module 640 may also include control circuitry for controlling one or more sensors included therein.

The input module 650 may include a touch panel 652, a (digital) pen sensor 654, a key 656, an ultrasonic input device 658, and/or the like.

As an example, the touch panel 652 may detect touch input using capacitive, resistive, infrared, ultrasonic methods, and/or the like. The touch panel 652 may also include a touch panel controller (not shown). As an example, a capacitive-type touch panel may detect proximity inputs (e.g. hovering input) in addition to, or as an alternative to, physical touch inputs. The touch panel 652 may also include a tactile layer. According to various embodiments of the present disclosure, the touch panel 652 may provide haptic (or other) feedback to the user using the tactile layer.

As an example, the (digital) pen sensor 654 may be implemented using methods identical to or similar to receiving a touch input from a user, or using a separate detection sheet (e.g., a digitizer).

As an example, the key 656 may be a keypad, a touch key, and/or the like.

As an example, the ultrasonic input device 658 may be a device configured to identify data by detecting, using a microphone (e.g., microphone 688), ultrasonic signals generated by a device capable of generating the ultrasonic signal. The ultrasonic input device 658 may detect data wirelessly.

According to various embodiments of the present disclosure, the electronic device 601 may receive user input from an external device (e.g., a network, computer or server) connected to the electronic device 601 using the communication module 620.

The display module 660 (e.g., display 150) may include a panel 662, a hologram device 664, a projector 666, and/or the like. As an example, the panel 662 may be, for example, a Liquid-Crystal Display (LCD), an Active-Matrix Organic Light-Emitting Diode (AM-OLED) display, and/or the like. As an example, the panel 662 may be configured to be flexible, transparent, and/or wearable. The panel 662 and the touch panel 652 may be implemented as a single module.

The hologram device 664 may provide a three-dimensional image. For example, the hologram device 664 may utilize the interference of light waves to provide a three-dimensional image in empty space. The projector 666 may provide image by projecting light on a surface (e.g., a wall, a screen, and/or the like). As an example, the surface may be positioned internal or external to electronic device 601. According to various embodiments of the present disclosure, the display module 660 may also include a control circuitry for controlling the panel 662, the hologram device 664, the projector 666, and/or the like.

The interface 670 may include, for example, one or more interfaces for a High-Definition Multimedia Interface (HDMI) 672, a Universal Serial Bus (USB) 674, a projector 676, or a D-subminiature (D-sub) 678, and/or the like. The interface 670 may be part of the communication interface 620. Additionally or alternatively, the interface 670 may include one or more interfaces for Mobile High-definition Link (MHL), Secure Digital (SD)/MultiMedia Card (MMC), Infrared Data Association (IrDA), and/or the like.

The audio module 680 may encode/decode sound into electrical signal, and vice versa. According to various embodiments of the present disclosure, at least a portion of audio module 680 may be part of the I/O interface 140. As an example, the audio module 680 may encode/decode voice information that is input into, or output from, the speaker 682, the receiver 684, the earphone 686, the microphone 688, and/or the like.

The camera module 691 may capture still images and/or video. According to various embodiments of the present disclosure, the camera module 691 may include one or more image sensors (e.g., front sensor module, rear sensor module, and/or the like) (not shown), an Image Signal Processor (ISP) (not shown), or a flash (e.g., Light-Emitting Diode (flash LED), xenon lamp, and/or the like) (not shown).

The power management module 695 may manage electrical power of the electronic device 601. Although not shown, the power management module 695 may include, for example, a Power Management Integrated Circuit (PMIC), a charger Integrated Circuit (charger IC), a battery gauge, a fuel gauge, and/or the like.

As an example, the PMIC may be disposed in an integrated circuit or an SoC semiconductor. The charging method for the electronic device 601 may include wired or wireless charging. The charger IC may charge a battery, may prevent excessive voltage or excessive current from a charger from entering the electronic device 601, and/or the like. According to various embodiments of the present disclosure, the charger IC may include at least one of a wired charger IC or a wireless charger IC. As an example, the wireless charger IC may be a magnetic resonance type, a magnetic induction type, an electromagnetic wave type, and/or the like. As an example, the wireless charger IC may include circuits such as a coil loop, a resonance circuit, a rectifier, and/or the like.

The battery gauge may measure a charge level, a voltage while charging, a temperature of the battery 696, and/or the like.

The battery 696 may supply power to the electronic device 601. The battery 696 may be a rechargeable battery, a solar battery, and/or the like.

The indicator 697 may indicate one or more states (e.g., boot status, message status, charge status, and/or the like) of the electronic device 601 or a portion thereof (e.g., AP 610). The motor 698 may convert an electrical signal into a mechanical vibration.

Although not shown, the electronic device 601 may include one or more devices for supporting mobile television (mobile TV) (e.g., a Graphics Processing Unit (GPU)), and/or the like. The devices for supporting mobile TV may support processing of media data compliant with, for example, Digital Multimedia Broadcasting (DMB), Digital Video Broadcasting (DVB), media flow, and/or the like.

It will be appreciated that various embodiments of the present disclosure according to the claims and description in the specification can be realized in the form of hardware, software or a combination of hardware and software.

Any such software may be stored in a non-transitory computer readable storage medium. The non-transitory computer readable storage medium stores one or more programs (software modules), the one or more programs comprising instructions, which when executed by one or more processors in an electronic device, cause the electronic device to perform a method of the present disclosure.

Any such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disk (CD), Digital Versatile Disc (DVD), magnetic disk or magnetic tape or the like. It will be appreciated that the storage devices and storage media are various embodiments of non-transitory machine-readable storage that are suitable for storing a program or programs comprising instructions that, when executed, implement various embodiments of the present disclosure. Accordingly, various embodiments provide a program comprising code for implementing apparatus or a method as claimed in any one of the claims of this specification and a non-transitory machine-readable storage storing such a program.

While the disclosure has been shown and described with reference to various embodiments thereof, it will be understood by those skilled in the art that various changes in form and details may be made therein without departing from the spirit and scope of the disclosure as defined by the appended claims and their equivalents. Various embodiments of the present disclosure are described as examples only and are noted intended to limit the scope of the present disclosure. Accordingly, the scope of the present disclosure should be understood as to include any and all modifications that may be made without departing from the technical spirit of the present disclosure.

What is claimed is:

1. A method for secure electronic payment, the method comprising:
   authenticating a user of an electronic device by executing a trusted payment application in a trusted execution environment of the electronic device;
   receiving credit card data from the user;
   generating, using a processor, credit card track data by the trusted payment application executing in the trusted execution environment based on the credit card data;
   storing the credit card track data in a secure memory of the electronic device; and
   rejecting input of raw credit card track data not generated via the generating of the credit card track data.

2. The method of claim 1, wherein the generating of the credit card track data in the trusted execution environment based on the credit card data comprises:
   performing a mutual authentication process with a credit card processor corresponding to the credit card data;

transmitting the credit card data to the credit card processor; and receiving the credit card track data from the credit card processor, the credit card track data generated based on the credit card data.

3. The method of claim 2, wherein the performing of the mutual authentication process comprises:

transmitting at least one first digital certificate to the credit card processor, the at least one first digital certificate signed with a private key of the electronic device;

receiving at least one second digital certificate from the credit card processor, the at least one second digital certificate signed with a private key of the credit card processor;

verifying the at least one second digital certificate based on a corresponding public key of the credit card processor; and receiving a verification of the at least one first digital certificate from the credit card processor.

4. The method of claim 1, wherein the credit card data comprises a credit card number, a credit card expiration date, a Card Verification Value (CVV), an issuing bank, identification of a credit card processor, or a billing zip code.

5. The method of claim 1, wherein the credit card data is generated dynamically and used for a single transaction.

6. The method of claim 1, wherein authenticating the user comprises receiving biometric information of the user.

7. The method of claim 1, wherein the credit card data is generated in a same format as the data on the credit card's magnetic strip.

8. A method for secure electronic payment, the method comprising:

authenticating a user of an electronic device executing a trusted payment application in a trusted execution environment of the electronic device;

receiving credit card data from the user;

generating credit card track data in the trusted execution environment based on the credit card data;

storing the credit card track data in a secure memory of the electronic device, the secure memory being accessible only via the trusted execution environment;

rejecting input of raw credit card track data not generated via the generating of the credit card track data; and transmitting the credit card track data to a magnetic card reader, wherein the transmitting of the credit card track data to the magnetic card reader comprises applying an electrical signal to a magnetic stripe swipe simulator based on the credit card track data so as to generate a magnetic field capable of being read by the magnetic card reader, and wherein the generating of the credit card track data comprises generating the credit card track data by the trusted payment application executing in the trusted execution environment.

9. An electronic device for secure electronic payment, the electronic device comprising:

a memory including a secure memory and an unsecure memory;

a magnetic stripe swipe simulator configured to generate a magnetic field capable of being read by a magnetic card reader; and a processor configured to execute a trusted execution environment including a trusted payment application, the processor configured to execute the trusted payment application to:

authenticate a user, receive credit card data from the user, generate credit card track data by the trusted payment application executing in the trusted execution environment based on the credit card data, store the credit card track data in the secure memory, and reject input of raw credit card track data not generated via the generating of the credit card track data.

10. The electronic device of claim 9, wherein the magnetic stripe swipe simulator comprises a copper coil wound in a substantially rectangular shape and electronically coupled to the processor.

11. The electronic device of claim 9, wherein the processor comprises a system on chip (SoC) dedicated to executing the trusted execution environment.

12. The electronic device of claim 9, wherein the instructions to generate the credit card track data in the trusted execution environment based on the received credit card data comprise instructions to:

perform a mutual authentication process with a credit card processor corresponding to the received credit card data;

transmit the credit card data to the credit card processor; and receive the credit card track data from the credit card processor, the credit card track data generated based on the credit card data.

13. The electronic device of claim 12, wherein the mutual authentication process comprises instructions to:

transmit at least one first digital certificate to the credit card processor, the at least one first digital certificate signed with a private key of the electronic device;

receive at least one second digital certificate from the credit card processor, the at least one second digital certificate signed with a private key of the credit card processor;

verify the at least one second digital certificate based on a corresponding public key of the credit card processor; and receive a verification of the at least one first digital certificate from the credit card processor.

14. The electronic device of claim 9, wherein the credit card data comprises a credit card number, a credit card expiration date, a Card Verification Value (CVV), an issuing bank, identification of a credit card processor, or a billing zip code.

15. The electronic device of claim 9, wherein the processor is further configured to execute instructions comprising:

controlling the magnetic stripe swipe simulator to broadcast the stored credit card track data to the magnetic card reader, wherein the instructions to control the magnetic stripe swipe simulator to broadcast the stored credit card track data to the magnetic card reader comprise instructions to apply an electrical signal to the magnetic stripe swipe simulator based on the credit card track data so as to generate a magnetic field capable of being read by the magnetic card reader.

16. The electronic device of claim 9, wherein the credit card data is generated dynamically and used for a single transaction.

17. The electronic device of claim 9, wherein the credit card data is generated in a same format as the data on the credit card's magnetic strip.

18. A non-transitory computer-readable storage medium storing instructions that, when executed, cause at least one processor to perform a method comprising:

authenticating a user of an electronic device executing a trusted payment application in a trusted execution environment of the electronic device;

receiving credit card data from the user;

generating, by the at least one processor, credit card track data by the trusted payment application executing in the trusted execution environment, based on the credit card data;

storing the credit card track data in a secure memory of the electronic device; and rejecting input of raw credit card track data not generated via the generating of the credit card track data.

19. The non-transitory computer-readable storage medium of claim 18, wherein the instructions to generate the credit card track data in the trusted execution environment based on the credit card data comprise instructions for:

performing a mutual authentication process with a credit card processor corresponding to the credit card data;

transmitting the credit card data to the credit card processor; and receiving the credit card track data from the credit card processor, the credit card track data generated based on the credit card data.

20. The non-transitory computer-readable storage medium of claim 18, wherein the credit card data comprises a credit card number, a credit card expiration date, a Card Verification Value (CVV), an issuing bank, identification of a credit card processor, or a billing zip code.

21. The non-transitory computer-readable storage medium of claim 18, wherein the credit card data is generated in a same format as the data on the credit card's magnetic strip.

* * * * *